(12) United States Patent  
Kral et al.

(10) Patent No.: US 8,707,757 B2
(45) Date of Patent: Apr. 29, 2014

(54) SEAT BELT TEST APPARATUS

(75) Inventors: Jiri Kral, Troy, MI (US); Stephen J Cassatta, Wixom, MI (US); Mark A. Morra, Clarkston, MI (US); Theresa M. Kondel, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 241 days.

(21) Appl. No.: 13/417,262

(22) Filed: Mar. 11, 2012

(65) Prior Publication Data

US 2013/0233050 A1 Sep. 12, 2013

(51) Int. Cl.
*G01P 15/00* (2006.01)
(52) U.S. Cl.
USPC .......................................... 73/12.13
(58) Field of Classification Search
USPC .......................................... 73/12.13
See application file for complete search history.

(56) References Cited

U.S. PATENT DOCUMENTS 5,058,244 A * 10/1991 Fernandez ............. 24/170
5,965,827 A * 10/1999 Stanley et al. ......... 73/862.391
7,242,286 B2 * 7/2007 Knox .................... 340/457.1

\* cited by examiner

*Primary Examiner* — Lisa Caputo
*Assistant Examiner* — Octavia Davis-Hollington

(57) ABSTRACT

A test apparatus collects performance data for a seat belt system having components providing operating stages of pre-tensioning, locking, and load limiting of the seat belt. A bench plate mounts the components of the seat belt system and includes first and second pulleys spaced apart on the bench plate and having the seat belt extending horizontally therebetween. At least one load sensor senses the load experienced by the seat belt. A resistor engages the seat belt between the first and second pulleys and pulls downwardly to introduce slack in the seat belt. An impactor mass is suspended above the seat belt and is released to free-fall onto the seat belt and impose a load on the seat belt simulating the load of a seated occupant being imposed on the seat belt. A control module energizes the pre-tensioning stage and a plotter records force versus time performance data.

19 Claims, 4 Drawing Sheets

SEAT BELT TEST APPARATUS

FIELD OF THE INVENTION

The present invention relates to an apparatus for bench testing the performance of seat belt systems.

BACKGROUND OF THE INVENTION

Vehicle seat belt systems typically include a length of belt defining a lap belt portion that extends horizontally across the lower torso and a shoulder belt portion that extends diagonally across the upper torso. The outboard end of the shoulder belt portion slides through a ring mounted high on the vehicle pillar and is wound within a retractor mounted low on the vehicle pillar. The outboard end of the lap belt portion is suitably mounted low on the pillar, seat, or on the floor. A latch plate is provided at the juncture of the inboard end of the shoulder belt portion and lap belt portion and is latched in a buckle mounted inboard the seat.

In its simplest form, the seat belt system utilizes a retractor with a spring biased reel that merely winds the belt taut about the occupant, and an inertia locking mechanism that locks that reel against unwinding rotation upon onset of a deceleration event. In more sophisticated seat belt systems, the seat belt system utilizes a pre-tensioner that will react to the deceleration event by pulling or reeling in a length of the belt to tighten the belt about the occupant before locking against unwinding rotation. The pre-tensioner may be provided in the reel, in the buckle mounting, or in the anchor mounting the outboard end of the lap belt. In addition, the more sophisticated systems have a load limiter that limits the load experienced by the belted occupant. This load limit feature is provided by a clutch or other device that will allow the belt to be paid out in a controlled manner when the load limit is reached. The load limiter can be provided in the retractor or at the buckle or at the mounting of the outboard ends of the lap or shoulder belt portions.

It would be desirable to provide a test apparatus in which the various components of a vehicle seat belt system could be mounted and tested to collect data related to the performance of an overall system configured from various components such as a retractor, a pre-tensioner, and a load limiter.

SUMMARY OF THE INVENTION

A test apparatus collects performance data for a seat belt system having components providing operating stages of pre-tensioning, locking, and load limiting of the seat belt. A bench plate mounts the components of the seat belt system and includes first and second pulleys spaced apart on the bench plate and having the seat belt extending horizontally therebetween. At least one load sensor senses the load experienced by the seat belt. A resistor engages the seat belt between the first and second pulleys and pulls downwardly to introduce slack in the seat belt. An impactor mass is suspended above the seat belt and is released to free-fall onto the seat belt and impose a load on the seat belt simulating the load of a seated occupant being imposed on the seat belt. A control module energizes the pre-tensioning stage and a plotter records force versus time performance data.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and not intended to limit the invention, its application, or uses.

Figure 1:
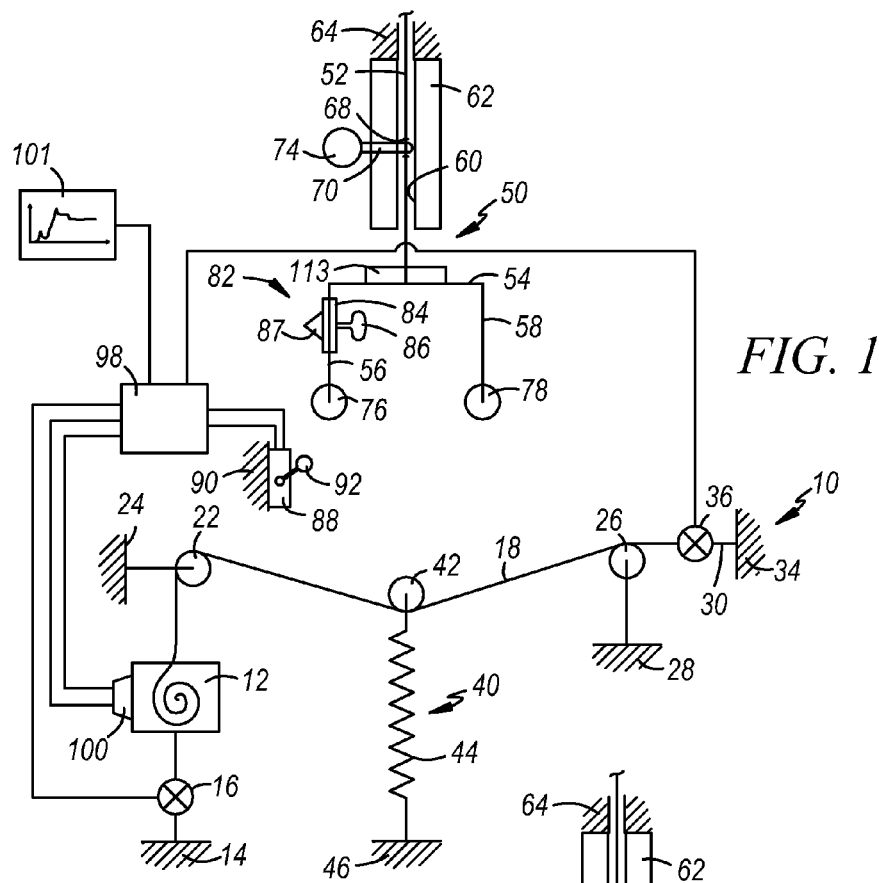
FIG. 1 is a simplified schematic of the test apparatus with the belt system installed thereon ready for testing.

Referring to FIG. 1, a test apparatus is shown for bench testing a seat belt system. A bench 10 has mounting supports that mount the components of the seat belt system. A retractor 12 is mounted on a support 14 by a load sensor 16. Belt 18 is wound within the retractor 12 and extends through a pulley 22 that is mounted on support 24. The belt 18 extends horizontally from the pulley 22 to pulley 26 that is mounted on support 28. An end 30 of belt 18 is connected to support 34 by a load sensor 36. Pulley 22 can be an actual slip ring from the seat belt assembly.

The test apparatus also includes a resistor, generally indicated at 40. In FIG. 1 the resistor 40 includes a pulley 42 that contacts the belt 18 between the pulleys 22 and 26. A spring 44 attached to the pulley 42 is mounted on support 46 and pulls down on the belt 18 that is extending horizontally between the pulleys 22 and 26. The resistor 40 will simulate the slack that typically exists in the belt 18 as it wraps around the occupant torso, and also simulates the friction of the belt 18 upon the occupant clothing and the compression of the occupant chest during occupant restraint by the belt system.

Figure 2:
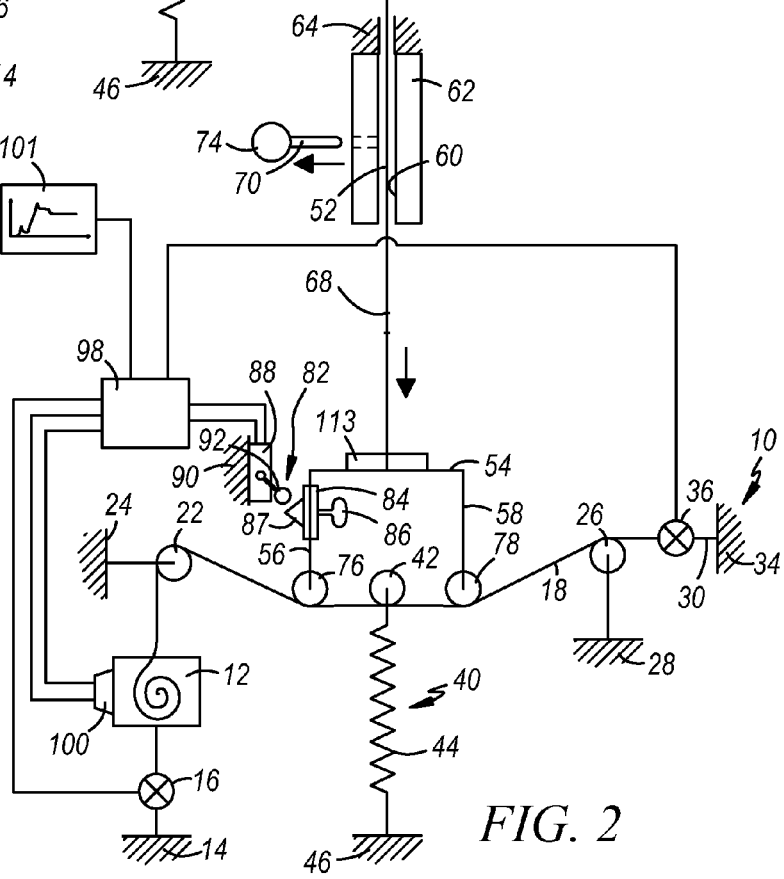
FIG. 2 shows initiation of the test procedure by releasing an impactor which falls upon the seat belt to impose load thereon.

The test apparatus also includes an impactor, generally indicated at 50, which will fall upon the belt 18 and thereby simulate forward momentum of the occupant during a vehicle deceleration event. The impactor 50 includes a handle 52 and a crossbar 54. The crossbar 54 supports laterally spaced legs 56 and 58. As seen in FIG. 1, the handle 52 is slidable up and down within a bore 60 provided in a tubular support 62 that is mounted on a support 64 of the bench 10. The handle 52 has a plurality of openings 68 along its length. A latch pin 70 is slidable within the tubular support 62 to engage within one of the openings 68 to retain the impactor 50 at its elevated position shown in FIG. 1. The latch pin 70 has a knob 74 so that the latch pin 70 can be pulled out of the opening 68 of the handle, allowing the impactor 50 to fall downwardly toward the belt 18 as seen in FIG. 2. The leg 56 has a pulley 76 and the leg 58 has a pulley 78. As seen in FIG. 1, the pulleys 76 and 78 of the impactor 50 are poised above the belt 18 as the belt 18 extends horizontally between the pulleys 22 and 26. In addition, as shown in FIG. 1, the pulleys 76 and 78 straddle the pulley 42 of the resistor 40.

The test apparatus also includes a triggering mechanism, generally indicated at 82, for triggering a pre-tensioner associated with the retractor 12. The triggering mechanism 82 includes a housing 84 that slides up and down on leg 56 of the impactor 50. A thumbscrew 86 is mounted on housing 84 and can be tightened against the leg 56 to lock the housing 84 in place on the leg 56. A cam 87 extends from the housing 84 for operating a limit switch 88. The limit switch 88 is mounted on support 90 and has a lever 92.

As seen in FIG. 1, an electronic control module 98 is provided for controlling the test apparatus. The electronic control module 98 is electrically connected to the load sensor 16, load sensor 36, and limit switch 88. Electronic control module 98 is also electrically connected to a pre-tensioner 100 of the seat belt retractor 12. In addition, the control module 98 is connected to a data plotter 101 that will record the test results.

In operation, the various components of the seat belt system that is to be tested will be mounted in the test apparatus as shown in FIG. 1. The belt 18 is suspended between the pulleys 22 and 26 and the resistor 40 is applying a load on the belt 18. The test operator will initiate the test by pulling the knob 74 to withdraw the latch pin 70 from the opening 68 of the handle 52 of impactor 50. Impactor 50 will then fall vertically downward, picking up speed under the force of gravity. The cam 87 of the triggering mechanism 82 will actuate lever 92 of the limit switch 88, as shown in FIG. 2, causing the control module 98 to energize the pre-tensioner 100 of retractor 12. The pre-tensioner 100 of retractor 12 will begin to forcibly reel in the belt 18, thus removing the slack that had been introduced into the belt 18 by the downward pull of the resistor 40. As the spring 44 of the resistor 40 is extending and the belt 18 is being pre-tensioned, the impactor 50 is continuing to fall toward the belt 18.

Figure 3:
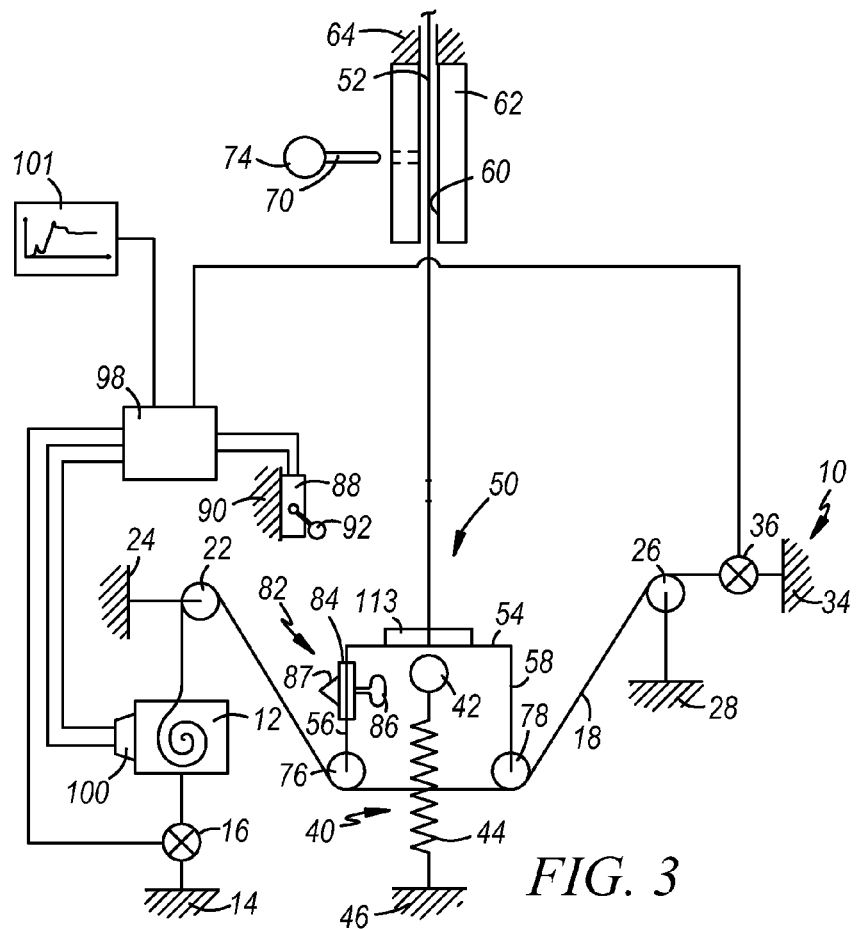
FIG. 3 is a view similar to FIGS. 1 and 2 but showing the position of the test apparatus at the conclusion of the test.

In FIG. 2, it is seen that the impactor 50 has continued to fall and the pulleys 76 and 78 of the impactor 50 have engaged the belt 18. In FIG. 3 the impactor 50 has descended further and the belt 18 is carried away from the pulley 42 of the resistor 40, so that the resistor 40 no longer contacts the seat belt.

Figure 4:
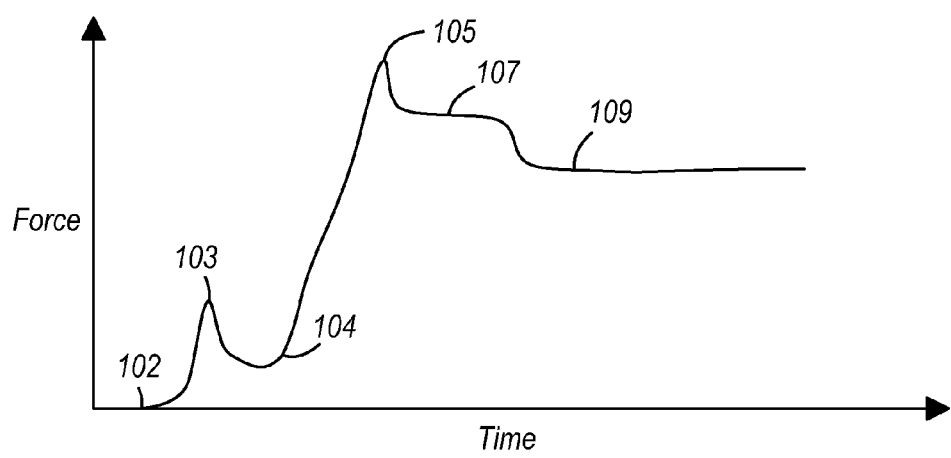
FIG. 4 is a graph of force versus time for a typical test.

FIG. 4 is a graph plotting force versus time. This test data is collected by the data plotter 101 during the performance of the test of the seat belt system. The timing is initiated when the operator pulls the latch pin 70 or when the limit switch is actuated. The force scale is a measure of the load experienced at each of the load sensors 16 and 36.

At 102, of the graph the pre-tensioner 100 has been triggered by the limit switch 88, causing the force on the belt 18 to rise as the pre-tensioner is forcibly winding up the belt 18 against the resistance of the resistor 40. The pre-tensioning stage ends at 103 and the load on the belt 18 will momentarily fall off. Then at 104, the free-falling impactor 50 has its pulleys 76 and 78 begin impacting the belt 18, causing a rapidly increasing load on the belt 18 until the peak load is obtained at 105. Thereafter, the load limiter within the retractor 12 begins to limit the load as shown at 107 of the graph. The load limiter can be a single stage load limiter or the load limiter can be a dual stage load limiter in which the load will then be reduced from the load level at 107 to a lesser load level at 109.

It will be understood that the graph shown in FIG. 4 is an approximation of a force versus time plot for a retractor 12, and various fluctuations will be routinely observed during the testing of actual hardware. The test apparatus of FIGS. 1, 2, and 3 can be easily and readily adjusted in order to test seat belt components under various conditions of time and force. For example, the elevation of the impactor 50 above the belt 18 can be varied simply by choosing which of the openings 68 within the handle 52 is to be engaged by the latch pin 70. By raising the height of the impactor 50, the force and speed with which the belt 18 is impacted can be increased. Furthermore, removable weights, one of which is shown at 113, can be loaded upon the crossbar 54, thus increasing the mass of the impactor 50 and its level of impact on the belt 18. In addition, the triggering mechanism 82 can be adjusted to control the actuation of the limit switch 88 which will in turn actuate the pre-tensioner 100. Thus by controlling and changing these parameters, the test apparatus can conduct performance tests of the seat belt apparatus over a large range of operating conditions that might occur in an actual vehicle incident.

Figures 5, 6, 7:
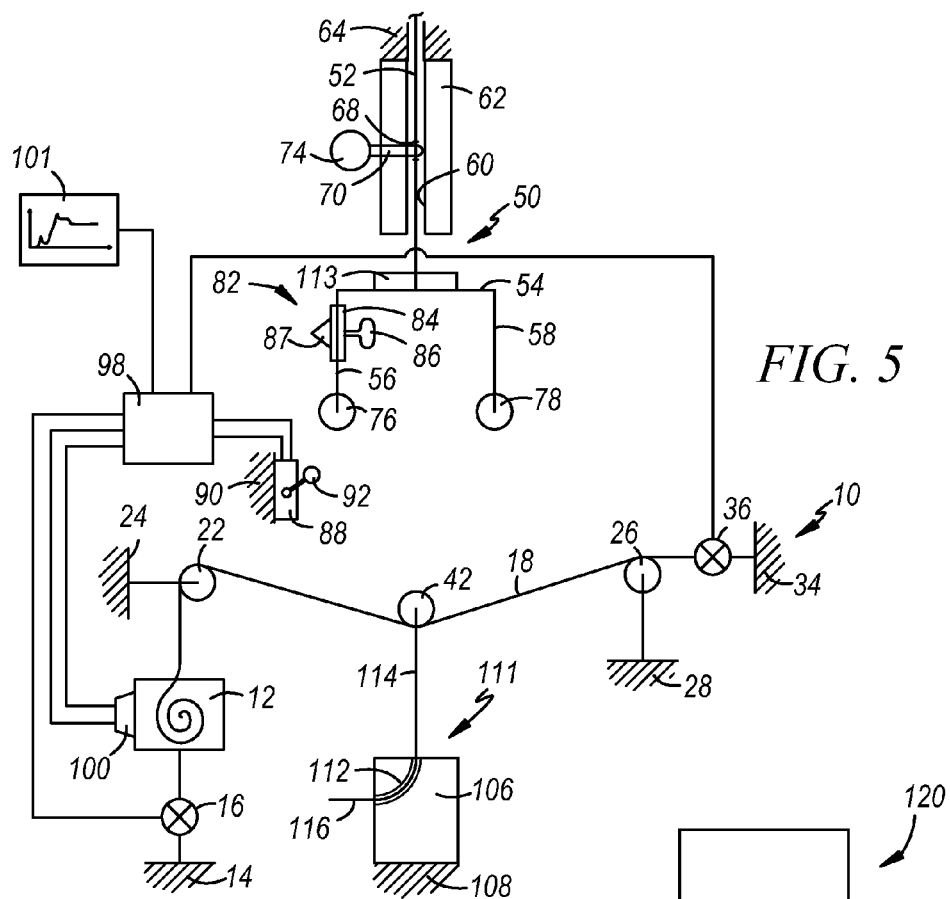
FIG. 5 is a test apparatus similar to FIG. 1 but showing an alternative embodiment of the resistor.
FIGS. 6-9 disclose yet another alternative embodiment of the resistor for use in the test apparatus of FIG. 1.

In the embodiment of FIG. 1, the resistor 40 introducing slack into the belt and resisting the effort of the pre-tensioner 100 is provided by a spring 44. If desired a dampener can be associated with the spring 44. FIG. 5 shows an alternative embodiment of the resistor that was employed in FIGS. 1-3. In FIG. 5, a resistor 111 includes a die block 106 mounted on a support 108 of the bench 10. The die block 106 has an internal curved passage 112. The pulley 42 is mounted on a stiff but ductile wire 114 having a lower end 116 that extends through the curved passage 112 of the die block 106. When the pre-tensioner 100 is actuated, belt 18 is reeled into the retractor 12 and pulls upwardly on the pulley 42, which in turn pulls upwardly on ductile wire 114. The lower end 116 of ductile wire 114 is pulled through the curved passage 112 and thus is progressively bent and unbent. This bending and unbending of the ductile wire 114 imposes a resistance on the upward movement of the Pulley 42, and thus acts as a resistor which simulates the slack that typically exists in the belt 18 as it wraps around the occupant waist and upper torso, and also simulates the friction of the belt 18 upon the occupant clothing and the compression of the occupant chest during occupant restraint by the belt system.

Figure 8:
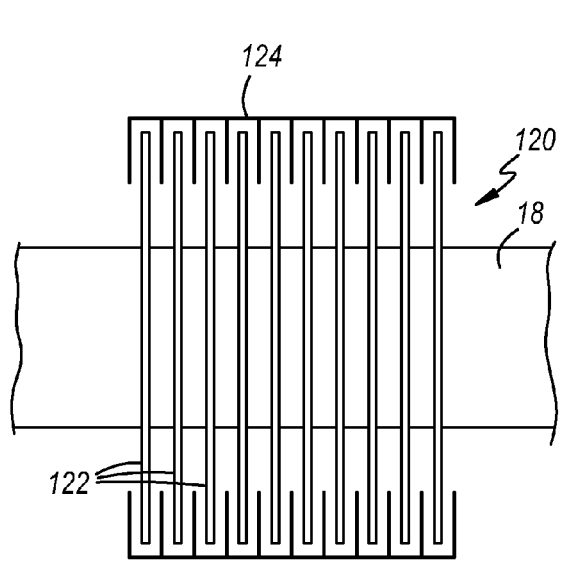
Figure 9:
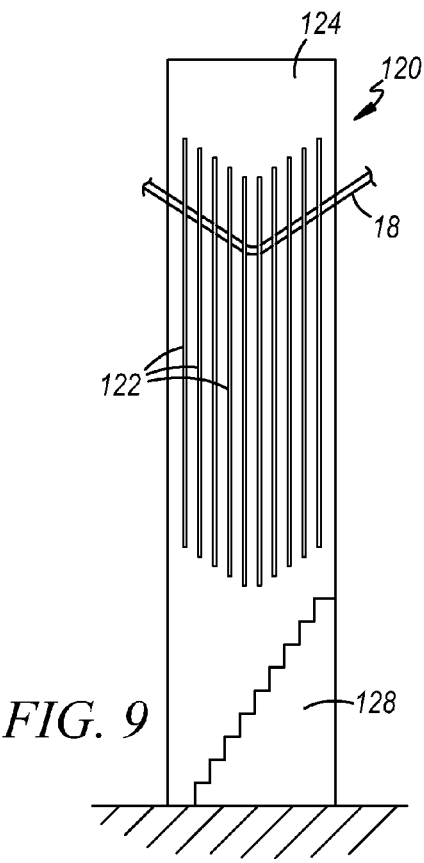

FIGS. 6-9 show yet another embodiment of the resistor, generally indicated at 120. In FIGS. 6, 7, and 8 a plurality of inverted U-shaped weights 122 are standing within a housing 124. The U-shaped weights 122 are vertically staggered on a stair step riser 128 provided within the housing 124 as best seen in FIG. 6. The belt 18 is passing into the housing 124 and captured in the U-shaped weights 122. FIG. 6 shows the position of these U-shaped weights 122 at the beginning of the test and thus corresponds with the position of the resistor 40 as shown in FIG. 1. When the pre-tensioner 100 is actuated, the belt 18 is reeled into the retractor 12 and pulls upwardly on the belt 18. Belt 18 will in turn begin lifting the U-shaped weights 122 vertically, one after another to the elevated position shown in FIG. 9. Thus as the winding in of the belt 18 progresses, the number of U-shaped weights 122 being lifted will progressively increase to thereby progressively increase the resistance on the belt 18.

Figure 10:
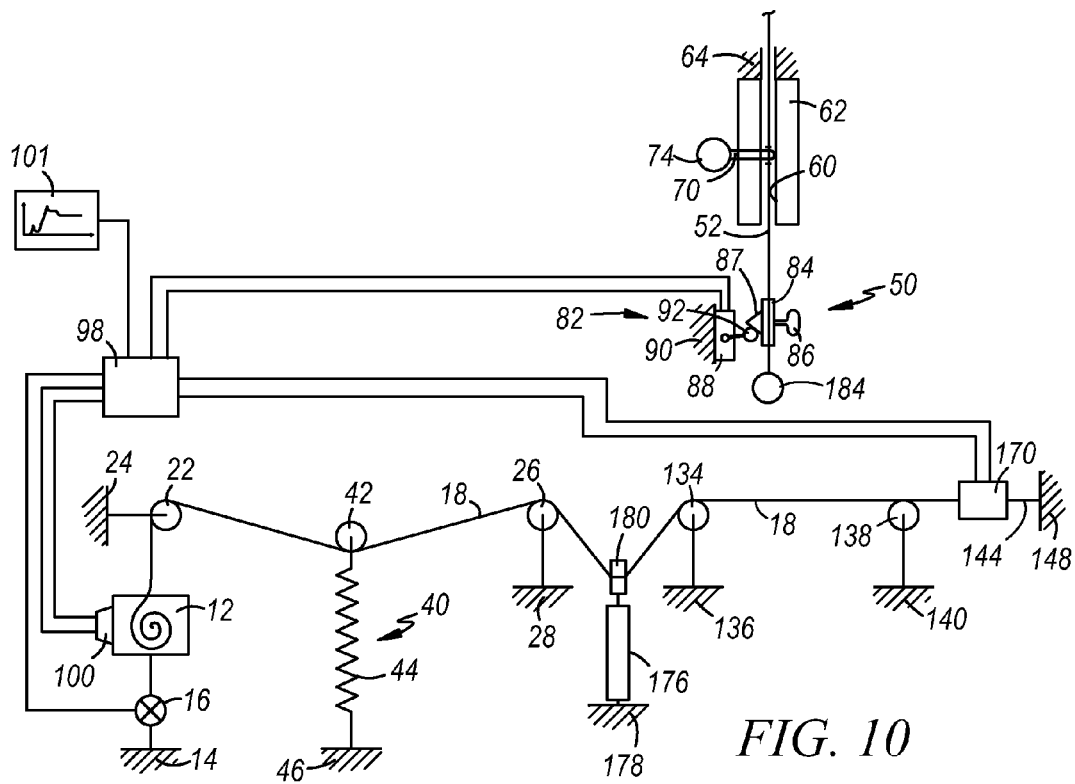
FIG. 10 shows the test apparatus being employed to test a seat belt system having additional component elements.

FIG. 10 shows another embodiment of the test apparatus of this invention. In FIG. 10 elements that are the same as those in FIG. 1 are designated with like numerals. FIG. 10 shows that additional components can be readily tested using the apparatus of FIG. 1. In particular, in FIG. 10 an anchor pre-tensioner 170 is included in the seat belt system being tested. Anchor pre-tensioner 170 would typically be mounted on the seat or vehicle body and anchor the outboard end of the lap belt. The anchor pre-tensioner 170 is pyrotechnic or mechanical and is electrically connected to the control module 98. In addition, the seat belt system being tested in FIG. 10 includes a buckle pre-tensioner 176 that is mounted on a support 178 and connected to a cinching latch plate 180. The buckle pre-tensioner 176, like the anchor pre-tensioner 170, is mechanically or pyrotechnically powered and is electrically connected to the control module 98. In FIG. 10, the impactor 50 has a single pulley 184 mounted on the lower end of the handle 52. When the test operator pulls the latch pin 70, impactor 50 will fall upon the belt 18 between the pulleys 134 and 138. As the impactor 50 falls, the cam 87 of triggering mechanism 82 will trigger the limit switch 88 sending a signal to the control module 98. The control module will in turn actuate the various pre-tensioners, including the retractor pre-tensioner 100, the anchor pre-tensioner 170, and the buckle pre-tensioner 176.

Accordingly, in comparing the embodiments of FIGS. 1 and 10, it is seen and understood that additional seat belt components such as additional pre-tensioners and cinching mechanisms can be added into the test bench set up and tested according to the apparatus disclosed herein.

Thus, in view of the foregoing it is seen that the invention provides a new and improved test apparatus for testing the performance of a motor vehicle safety belt systems.

What is claimed is:

1. A test apparatus for collecting performance data for a seat belt system including components providing operating stages including, pre-tensioning, locking, and load limiting of the seat belt, comprising:
    a bench plate for mounting of the components of the seat belt system;
    first and second pulleys spaced apart on the bench plate and having the seat belt extending horizontally therebetween;
    at least one load sensor sensing the load experienced by the seat belt;
    a resistor engaging the seat belt between the first and second pulleys and pulling downwardly to introduce slack in the seat belt;
    and an impactor mass suspended above the seat belt and being released to free-fall onto the seat belt and impose a load on the seat belt simulating the load of a seated occupant being imposed on the seat belt.

2. The test apparatus of claim 1 further comprising at least one load sensor including a first load sensor mounting a retractor on the bench plate and a second load sensor mounting a second end of the seat belt on the bench plate.

3. The test apparatus of claim 1 further comprising the impactor mass being suspended above the seat belt between the first and second pulleys.

4. The test apparatus of claim 1 further comprising the impactor having a single pulley that engages with the seat belt to impose the load thereon.

5. The test apparatus of claim 1 further comprising the impactor having a pair of pulleys spaced apart and straddling the engagement of the resistor with the seat belt.

6. The test apparatus of claim 1 further comprising an control module for energizing at least one pre-tensioner component included in the seat belt system being tested.

7. The test apparatus of claim 6 further comprising a triggering mechanism carried by the impactor and electrically connected to the control module for triggering the energization of the at least one pre-tensioner.

8. The test apparatus of claim 1 further comprising the resistor being a spring acting upon a pulley engaging the seat belt.

9. The test apparatus of claim 1 further comprising the resistor being a ductile wire acting upon a pulley engaging the seat belt, and the ductile wire being pulled and bent through a die during wind up of the seat belt by the pre-tensioner.

10. The test apparatus of claim 1 further comprising the resistor being a plurality of weights progressively lifted up by the seat belt during wind up of the seat belt during the pre-tensioning stage.

11. A test apparatus for collecting performance data for a seat belt system including components providing operating stages including, pre-tensioning, locking, and load limiting of the seat belt, comprising:
    a bench plate for mounting of the components of the seat belt system;
    first and second pulleys spaced apart on the bench plate and having the seat belt extending horizontally therebetween;
    at least one load sensor sensing the load experienced by the seat belt;
    a resistor engaging the seat belt between the first and second pulleys and pulling downwardly to introduce slack in the seat belt;
    an impactor mass suspended above the seat belt and being released to free-fall onto the seat belt and impose a load on the seat belt simulating the load of a seated occupant being imposed on the seat belt
    a control module for energizing the pre-tensioning stage of the retractor;
    and a plotter for recording force versus time performance data.

12. The test apparatus of claim 11 further comprising the impactor mass including first and second pulleys that engage with the belt upon free falling of the impactor mass onto the belt.

13. The test apparatus of claim 11 further comprising a triggering mechanism triggered by the free falling of the impactor mass and electrically connected with the control module to initiate energization of the pre-tensioning stage.

14. The test apparatus of claim 11 further comprising the resistor being a spring acting upon a pulley engaging the seat belt.

15. The test apparatus of claim 11 further comprising the resistor being a ductile wire acting upon a pulley engaging the seat belt, and the ductile wire being pulled and bent through a die during wind up of the seat belt by the pre-tensioner.

16. The test apparatus of claim 11 further comprising the resistor being a plurality of weights progressively lifted by the seat belt during wind up of the seat belt by the pre-tensioner.

17. A test apparatus for collecting performance data for a seat belt system including components providing operating stages including, pre-tensioning, locking, and load limiting of the seat belt, comprising:
    a bench plate for mounting of the components of the seat belt system;
    first and second pulleys spaced apart on the bench plate and having the seat belt extending horizontally therebetween;
    at least one load sensor sensing the load experienced by the seat belt;
    a resistor engaging the seat belt between the first and second pulleys and pulling downwardly to introduce slack in the seat belt;
    an impactor mass suspended above the seat belt and being released to free-fall onto the seat belt and impose a load on the seat belt simulating the load of a seated occupant being imposed on the seat belt;
    a control module for energizing the pre-tensioning stage;
    a triggering mechanism triggered by the free falling of the impactor mass and electrically connected with the control module to initiate energization of the pre-tensioning stage in response to the falling of the impactor;

and a plotter for recording force versus time performance data.

18. The test apparatus of claim 17 further comprising the impactor mass including first and second pulleys that engage with the belt upon free falling of the impactor mass onto the belt.

19. The test apparatus of claim 17 further comprising the resistor being one of a spring acting upon a pulley engaging the seat belt, a ductile wire acting upon a pulley engaging the seat belt, the ductile wire being pulled and bent and unbent through a die during wind up of the seat belt by the pretensioner, or a plurality of weights progressively applied to the seat belt during wind up of the seat belt by the pretensioner.

* * * * *